US011592355B2

(12) United States Patent
Vlahakis (10) Patent No.: US 11,592,355 B2
(45) Date of Patent: Feb. 28, 2023

(54) TRACKING AND TRANSMITTING AXLE MONITORING SYSTEM (71) Applicant: John A. Vlahakis, Katy, TX (US)

(72) Inventor: John A. Vlahakis, Katy, TX (US)

( * ) Notice: Subject to any disclaimer, the term of this patent is extended or adjusted under 35 U.S.C. 154(b) by 295 days.

(21) Appl. No.: 17/060,868

(22) Filed: Oct. 1, 2020

(65) Prior Publication Data

US 2021/0102867 A1 Apr. 8, 2021

Related U.S. Application Data (60) Provisional application No. 62/909,909, filed on Oct. 3, 2019.

(51) Int. Cl.
*G01F 23/02* (2006.01)
*G01M 13/02* (2019.01)
*G01S 19/01* (2010.01)
*G01S 13/08* (2006.01)
*G01H 11/06* (2006.01)
*G01K 1/08* (2021.01)

(52) U.S. Cl.
CPC ............. *G01M 13/02* (2013.01); *G01F 23/02* (2013.01); *G01H 11/06* (2013.01); *G01K 1/08* (2013.01); *G01S 13/08* (2013.01); *G01S 19/01* (2013.01)

(58) Field of Classification Search
CPC .......... G01F 23/02; G01H 11/06; G01K 1/08; G01M 13/02; G01S 13/08; G01S 19/01
See application file for complete search history.

(56) References Cited

U.S. PATENT DOCUMENTS

| 3,887,046 A * | 6/1975 | Bueler | G01P 3/488 |
| | | | 310/168 |
| 3,916,234 A * | 10/1975 | Stigall | F16C 41/007 |
| | | | 310/155 |
| 3,934,685 A * | 1/1976 | Jovick | G01P 3/488 |
| | | | 310/168 |
| 4,986,605 A * | 1/1991 | Descombes | F16C 33/723 |
| | | | 301/105.1 |
| 5,752,746 A | 5/1998 | Perry | |
| 6,203,114 B1 * | 3/2001 | Ehrlich | F16C 33/6607 |
| | | | 374/E11.006 |
| 6,286,992 B1 * | 9/2001 | Kyrtsos | B61K 9/06 |
| | | | 374/45 |
| 6,538,426 B1 * | 3/2003 | Enrietto | F16C 41/007 |
| | | | 374/E13.01 |
| 6,617,968 B1 * | 9/2003 | Odisho | G01F 23/263 |
| | | | 340/439 |

(Continued)

*Primary Examiner* — Eric S. McCall
(74) *Attorney, Agent, or Firm* — Keeling Law, LLC; Kenneth A. Keeling; Mark S. Solomon (57) ABSTRACT Embodiments of an axle monitoring system of the present invention generally include an oil bath cap plug equipped with a sensor assembly containing one or more power provision components, and an oil level monitor, a humidity/temperature sensor, a vibrational energy detector, and/or a GPS tracking chip, all of which are mounted on a microcircuit board, wherein the sensor assembly is adapted and configured to be fitted inside the axle oil bath cap plug. In various embodiments, information and/or data obtained by the sensor assembly can be transmitted, in raw or processed form, to one or more remote devices. Embodiments of a method of using embodiments of an axle monitoring system of the present invention are also provided.

10 Claims, 10 Drawing Sheets

(56) References Cited

U.S. PATENT DOCUMENTS

| | | |
|---|---|---|
| 6,742,386 B1 | 6/2004 | Larson |
| 6,776,261 B2 | 8/2004 | Eriksen et al. |
| 9,933,337 B2 | 4/2018 | White et al. |
| 2002/0124648 A1* | 9/2002 | Colussi .................. G01F 23/02 |
| | | 73/290 R |
| 2004/0250623 A1 | 12/2004 | Walker et al. |
| 2011/0270611 A1* | 11/2011 | Nishimura .............. F16N 29/00 |
| | | 704/E17.001 |
| 2016/0076973 A1* | 3/2016 | White ............... B60C 23/00363 |
| | | 73/115.07 |
| 2018/0156691 A1 | 6/2018 | Ehrhardt et al. |
| 2019/0118588 A1 | 4/2019 | Lesesky et al. |
| 2021/0129601 A1* | 5/2021 | Ferry ...................... G01L 17/00 |
| 2021/0131916 A1* | 5/2021 | Ferry ...................... G01L 17/00 |
| 2022/0180672 A1* | 6/2022 | Madrid ................... B60C 17/10 |
| 2022/0267483 A1* | 8/2022 | Tamai .................... C08F 14/18 |

* cited by examiner

TRACKING AND TRANSMITTING AXLE MONITORING SYSTEM

CROSS-REFERENCE TO RELATED APPLICATIONS

This application claims the benefit of U.S. Provisional Application No. 62/909,909, filed on Oct. 3, 2019, which application is incorporated herein by reference as if reproduced in full below.

STATEMENT REGARDING FEDERALLY SPONSORED RESEARCH OR DEVELOPMENT

Not Applicable.

FIELD OF THE INVENTION

The present invention generally relates to a system for monitoring physical parameters in a mobile environment. More particularly, embodiments of the present invention are directed to an apparatus and a method for tracking and transmitting the operational conditions and location of trailer axles.

BACKGROUND OF THE INVENTION

A majority of trailer repairs involve the trailer axles. Typically, trailer axle problems are not apparent until there is a noticeable, and often serious, axle failure. Traditionally, to diagnose any potential axle issues, the axles have to be at least partially disassembled. Specifically, the only way to effectively examine the structural integrity of the axle is to remove the hub and inspect the bearings.

DESCRIPTION OF THE RELATED ART

One prior art wheel end sensor, described in U.S. Pat. No. 9,933,337, to White et al., includes a system utilizing various sensors to detect certain physical parameters of axles; however, employment of this system requires replacement of the existing wheel hub and hub cap assembly with the specialized system components. U.S. Pat. No. 6,776,261, to Eriksen et al., describes a lubricant monitoring system for axles; however, employment of the system requires mounting an annular bearing spacer/lubricant reservoir and guide vein therefor on the axle. Described in United States Patent Application No. 2018/0156691, by Ehrhardt et al., is a wheel bearing assembly useful for monitoring the condition of a lubricant; however, employment of the system requires replacement of the existing bearing assembly. Although these systems may have some utility, it would be beneficial to have an axle sensor system that would allow for simple retrofitting of existing axles without the need to disassemble and/or replace existing components.

The present invention generally comprises an axle monitoring system that is capable of detecting and memorializing the operational conditions of trailer axles, particularly but not exclusively, oil-bath axles designed for trailers under 26,000 pounds gross vehicle weight rating (GVWR). Embodiments of the present invention are adapted and configured to serve as replacements for existing axle oil bath cap plugs, wherein installation of the axle monitoring system requires only simple removal of the existing plug and replacement thereof with the axle monitoring system.

BRIEF SUMMARY OF THE INVENTION

Embodiments of an axle monitoring system of the present invention generally include an oil bath cap plug equipped with a sensor assembly comprising one or more micro power provision components, and one or more oil level monitors, humidity/temperature sensors, vibrational energy detectors, and/or GPS tracking chips, all of which may be mounted on a microcircuit board, wherein the sensor assembly is adapted and configured to be fitted inside the axle oil bath cap plug. Embodiments of a method of using embodiments of an axle monitoring system of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

The exemplary embodiments are best understood by referring to the drawings, like numerals being used for like and corresponding parts of the various drawings. In the following description of embodiments, orientation indicators such as "top," "bottom," "up,' "down," "upper," "lower," "front," "back," etc. are used for illustration purposes only; the invention, however, is not so limited, and other possible orientations are contemplated.

Figure 1:
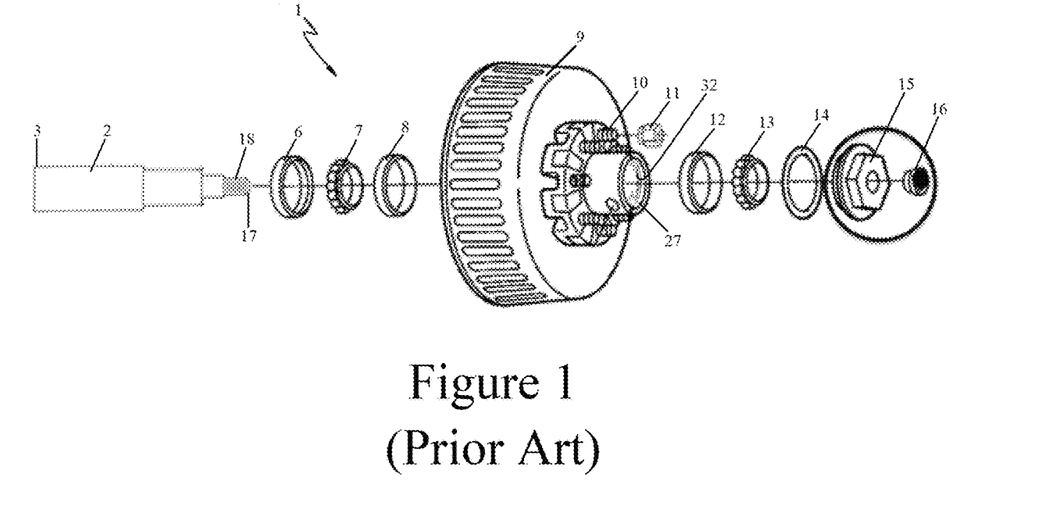
FIG. 1 is exploded view of a prior art axle hub assembly.

Referring first to FIG. 1, an example of a prior axle hub assembly 1 is depicted in an exploded view. In one embodiment, an axle hub assembly 1 comprises an axle spindle 2. In one aspect, a first end 3 of axle spindle 2 is attached to or integral with an end 4 of an axle 5 (see FIG. 10). In one embodiment, axle hub assembly 1 comprises an inner seal 6, inner bearing 7, inner race 8, hub drum 9, a plurality of lugs 10, lug nuts 11, outer race 12, outer bearing 13, outer seal 14, oil bath cap 15 and oil bath cap plug 16. The representation of a known axle hub assembly 1 of FIG. 1 is merely exemplary, and numerous variations thereof comprising more, fewer, and/or different components is contemplated with respect to utility of the present invention, as would be understood by one skilled in the art.

Figure 10:
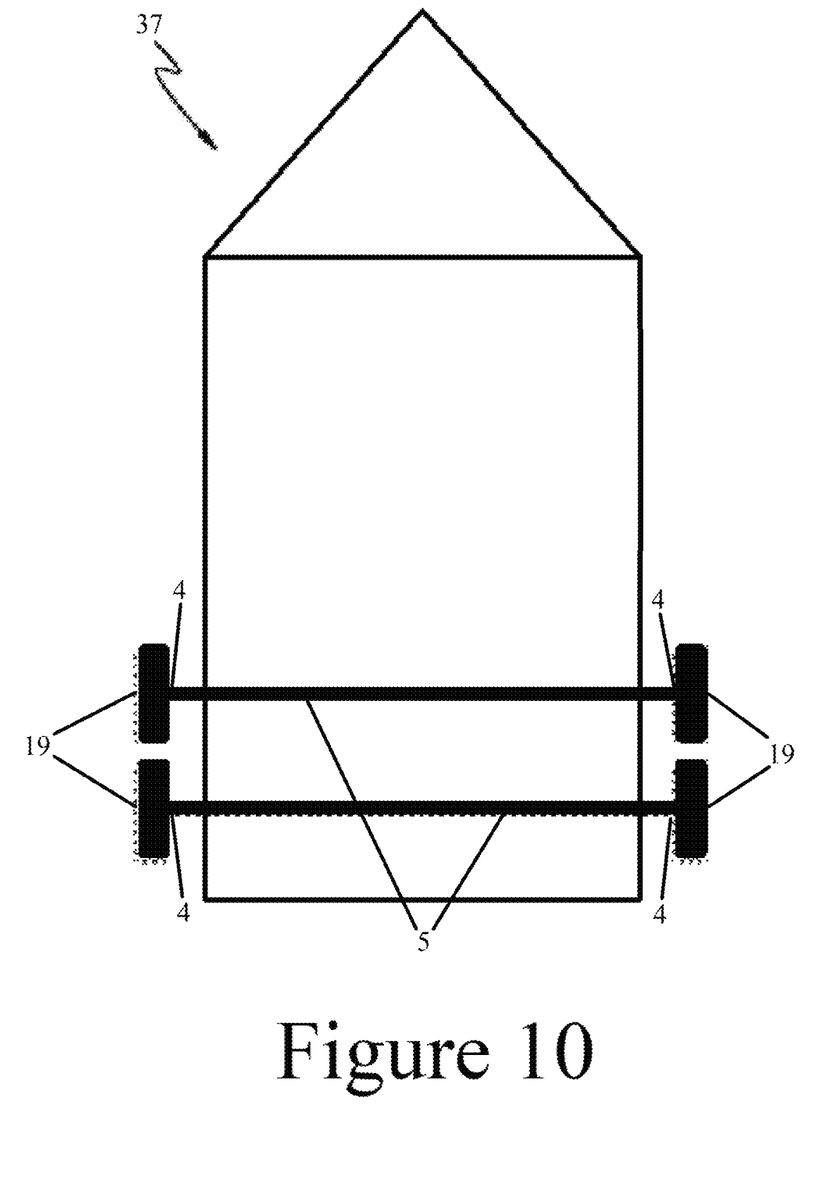
FIG. 10 is a view of a schematic representation of an embodiment of a trailer on which an embodiment of the present invention may be installed.

In one aspect, the components of axle hub assembly 1 are combinable to form an axle hub assembly (not shown), as would be understood by one skilled in the art. In one embodiment (not shown), a second end 17 of axle spindle 2 is engaged with oil bath cap 15 via screwed engagement of axle spindle 2 external threads 18 and internal threading (not shown) of oil bath cap 15. In one embodiment, oil bath cap 15 may be equipped with an O-ring 44 (see FIG. 8) to assist in providing sealed engagement with axle spindle 2, as would be understood by one skilled in the art. In one embodiment, an axle 5 is equipped with axle hub assemblies 1 at either end 4 thereof, as depicted in FIG. 10, although the axle hub assemblies 1 are not visible in FIG. 10 in light of wheel/tires 19 installed onto the axle hub assemblies 1.

Figure 1A:
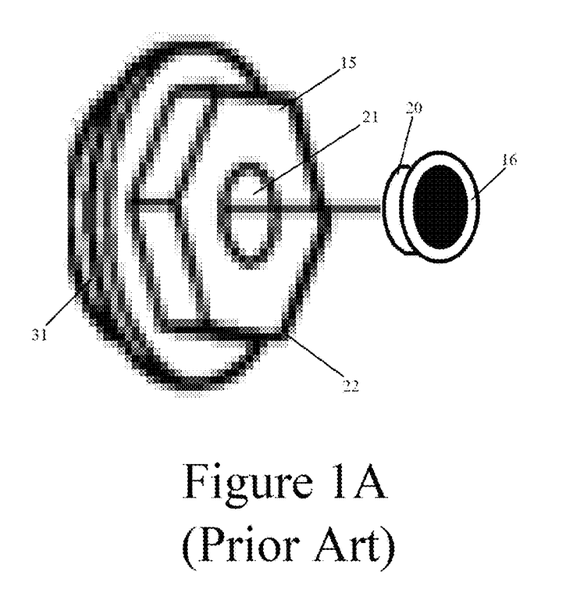
FIG. 1A is a close-up view of the encircled portion of FIG. 1.

FIG. 1A shows a close-up view of the prior art oil bath cap 15 and plug 16 encircled in FIG. 1. In one embodiment, oil bath cap 15 comprises external threading 31 which is adapted and configured to screwingly engage an internal threading 32 of hub drum 9. In one embodiment, oil bath cap 15 comprises a clear or translucent material, as is generally known in the art. In one embodiment, plug 16 comprises a compressible material, such as, but not limited to, natural or synthetic rubber, plastic, or elastic polymer. In one embodiment, a portion of a bottom section 20 of plug 16 is nominally larger in diameter than the diameter of an orifice 21 in a top end 22 of oil bath cap 15. In one embodiment, bottom section 20 of plug 16, proximate a lower end 24 thereof, may be compressed (e.g., manually) to allow for insertion thereof at least partially into orifice 21 of oil bath cap 15 (see FIG. 7), where upon re-expansion of bottom section 20, plug 16 is snugly secured within orifice 21. In one aspect, in this fashion plug 16 is removably affixable to oil bath cap 15, as is known in the art.

Figure 2:
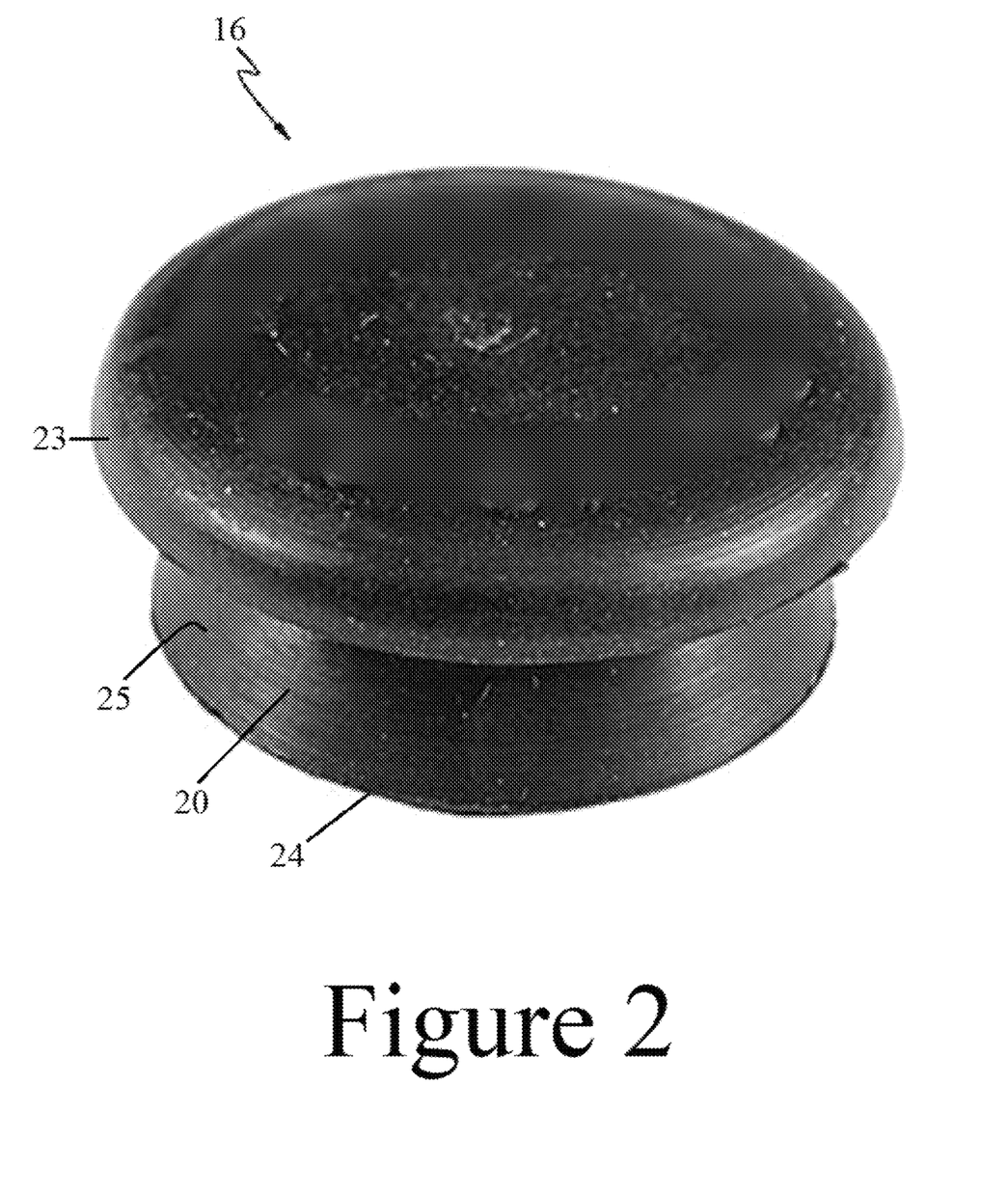
FIG. 2 is a perspective view of an embodiment of a hub assembly oil bath cap plug of the present invention.

Referring now to FIG. 2, in one embodiment, plug 16 comprises a substantially round, substantially tubular component comprising a top closed end section 23. In one embodiment, at least a portion of bottom section 20 comprises a smaller diameter than top closed end section 23, although other geometries may be employed. In one embodiment, at least a portion of a surface 25 of bottom section 20 is outwardly beveled between the juncture thereof with top closed end section 23 (not visible in FIG. 2) and a lower edge 24 of bottom section 20, although the invention is not so limited and other geometries and orientations may be employed.

Figure 3:
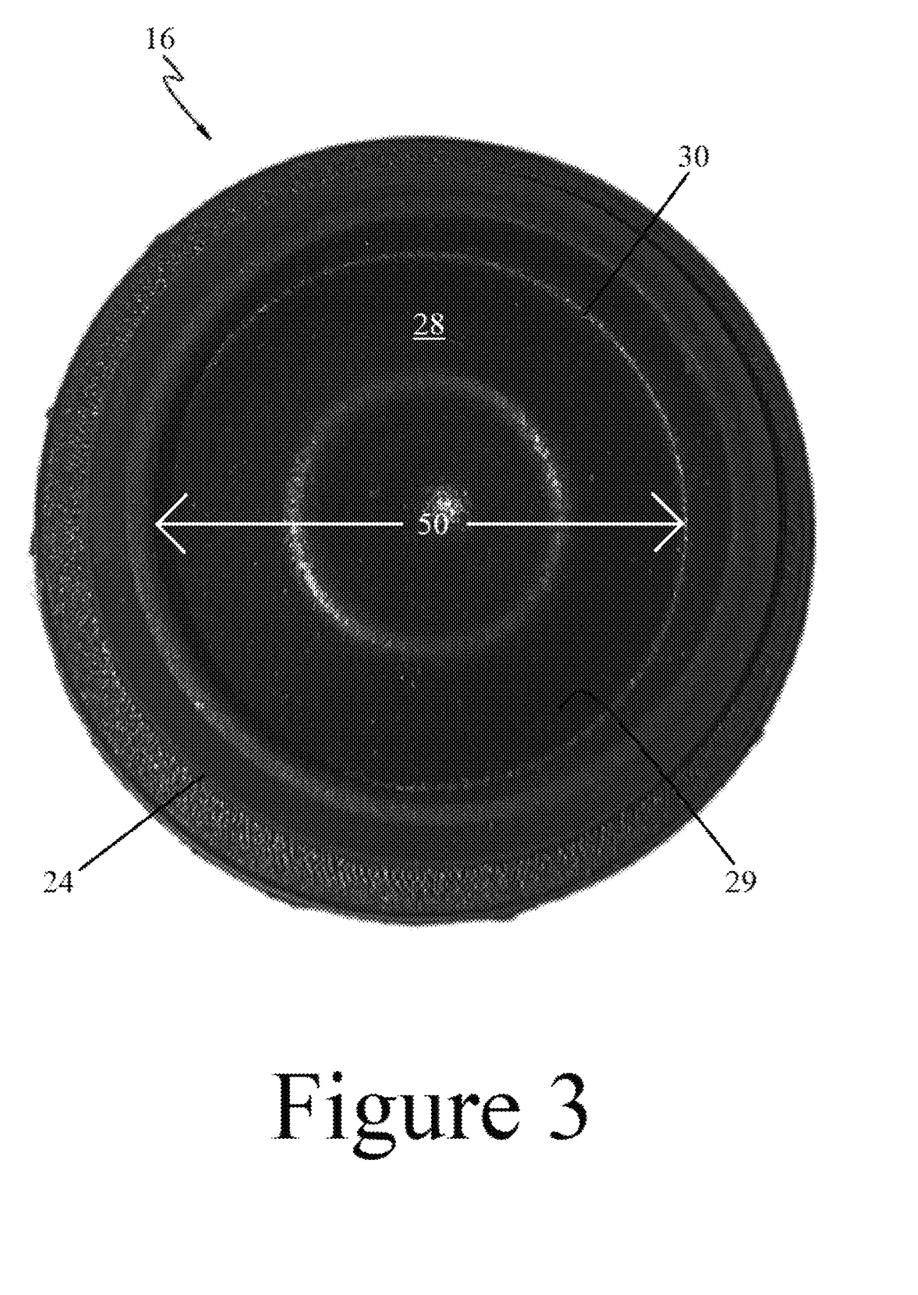
FIG. 3 is a bottom view of an embodiment of an axle hub assembly oil bath cap plug of the present invention.

FIG. 3 depicts a bottom view of an embodiment of a plug 16 of the present invention. As shown in the example of FIG. 3, plug 16 comprises an internal void 28 that is bounded at one end by an internal surface 29 of top closed end portion 23, and is open at lower edge 24 thereof. In one aspect, the interior dimensions of internal void 28 may be varied as desired based on axle hub assembly design parameters and/or operational requirements, as would be understood by one skilled in the art. In one embodiment, at least a portion of plug 16 comprises an external diameter of about 31.25 mm (1.2 in.) and at least a portion of plug 16 comprises an internal diameter 50 of about 28.5 mm (1.1 in.).

In one embodiment, plug 16 comprises an inner lip 30 disposed at least partially circumferentially around the interior of internal void 28. In one embodiment, inner lip 30 is adapted and configured such that one or more circuit board-mounted sensor assemblies 33 (see FIGS. 4 and 5) can be secured thereby between the lip 30 and internal surface 29 (see FIG. 6). In the embodiment shown in FIG. 3, at least a portion of top closed end section 23 protrudes from oil bath cap 15 orifice 21 when plug 16 is installed there into. This arrangement allows for easy removal of plug 16 from orifice 21, as is explained further below. In one embodiment, inner lip 30 may extend outwardly beyond the diameter of orifice 21, such that when plug 16 is installed in orifice 21, an outer portion 41 of lip 30 secures plug 16 against an inner surface 42 of oil bath cap 15. (See FIG. 8).

Figure 4:
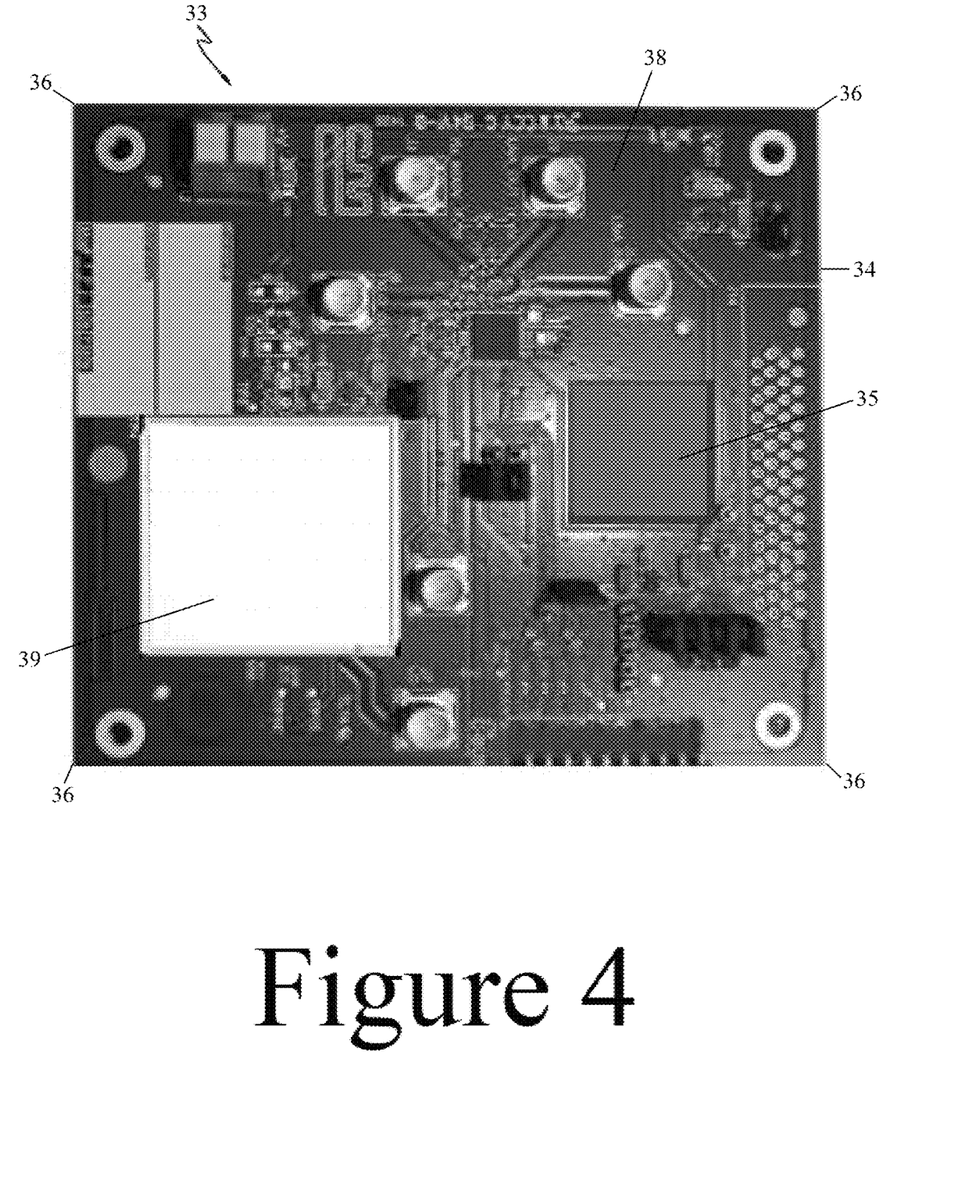
FIG. 4 is a view of the top side of an embodiment of sensor assembly of the present invention.
Figure 5:
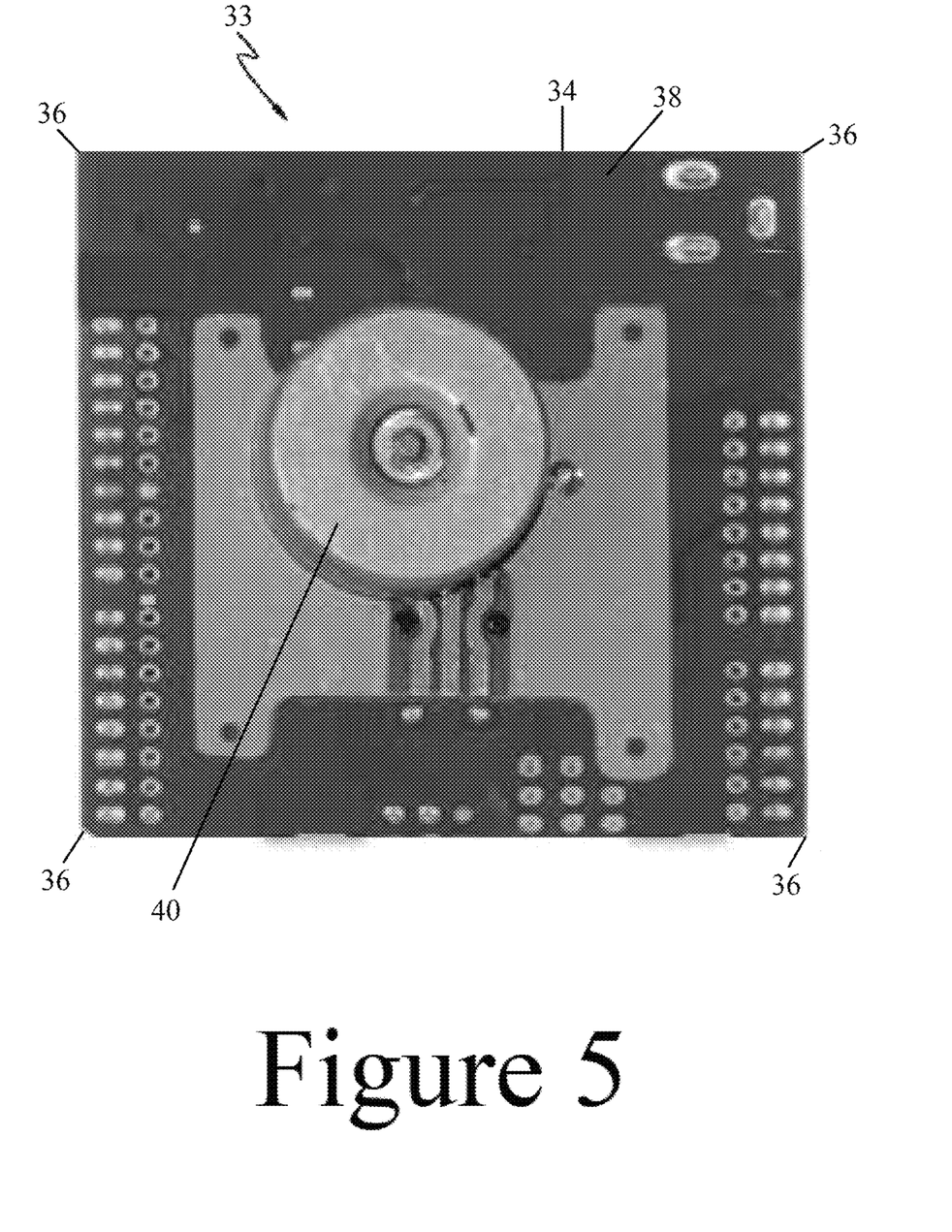
FIG. 5 is a view of the bottom side of an embodiment of a sensor assembly of the present invention.

Referring now to FIGS. 4 and 5, an embodiment of a circuit board-based sensor assembly 33 is depicted. In one embodiment, sensor assembly 33 is a substantially square component comprising dimensions of about 1 inch by 1 inch, although the invention is not so limited and other shapes and/or dimensions are contemplated. In one embodiment, sensor assembly 33 comprises a circuit board 38, such as, but not limited to, a model EV9942E circuit board available from CIVIL Microcircuits (USA), of Winston-Salem, N.C. In one embodiment, as shown in the view of the "bottom" side of sensor assembly 33 depicted in FIG. 4, sensor assembly 33 comprises a GPS tracking chip 39, such as, but not limited to, a model AirPrime XM1110 Multi-GNSS Module available from Sierra Wireless, Inc., of Richmond, British Columbia, Canada, and a micro-packaged temperature and humidity sensor 35, such as, but not limited to, a model HTS221 micro-packaged humidity/temperature sensor, available from STMicroelectronics, of Geneva, Switzerland. In one embodiment, the clear/translucent nature of oil bath cap 15 allows for visual inspection/monitoring of the level of lubricant oil utilized within axle hub assembly 1. In other embodiments (not shown), an oil level monitor may be employed as a component of sensor assembly 33. In other embodiments (not shown), a proximity sensor, such as, but not limited to, an ultrasonic proximity sensor may be employed as a component of sensor assembly 33 to provide a warning signal if barriers and/or other vehicles are too close. In other embodiments (not shown), circuit board-based sensor assembly 33 may comprise a component which may be utilized to detect vibrational energy, and in various embodiments, measure and monitor the detected vibrational energy. In one embodiment (not shown), vibrational energy may be sensed via high-frequency detection, although other means may be employed.

In one embodiment, as shown in FIG. 5 which depicts a "top" side of sensor assembly 33, sensor assembly 33 comprises one or more power provision components 40, such as, but not limited to, a standard CR2016 3V lithium battery, or a 3-volt kinetic micro generator available from Kinetron by, of Tilberg, The Netherlands. In one embodiment, a micro generator 40 may be rechargeable through rotation of the axle 5 to which it is attached, as would be understood by one skilled in the art. In other embodiments (not shown), a rechargeable or single-use battery 40 may be employed for power provision to sensor assembly 33. Although the embodiment shown in FIG. 5 depicts the power provision component 40 mounted on the circuit board 38, the invention is not so limited, and other configurations may be employed.

Figure 6:
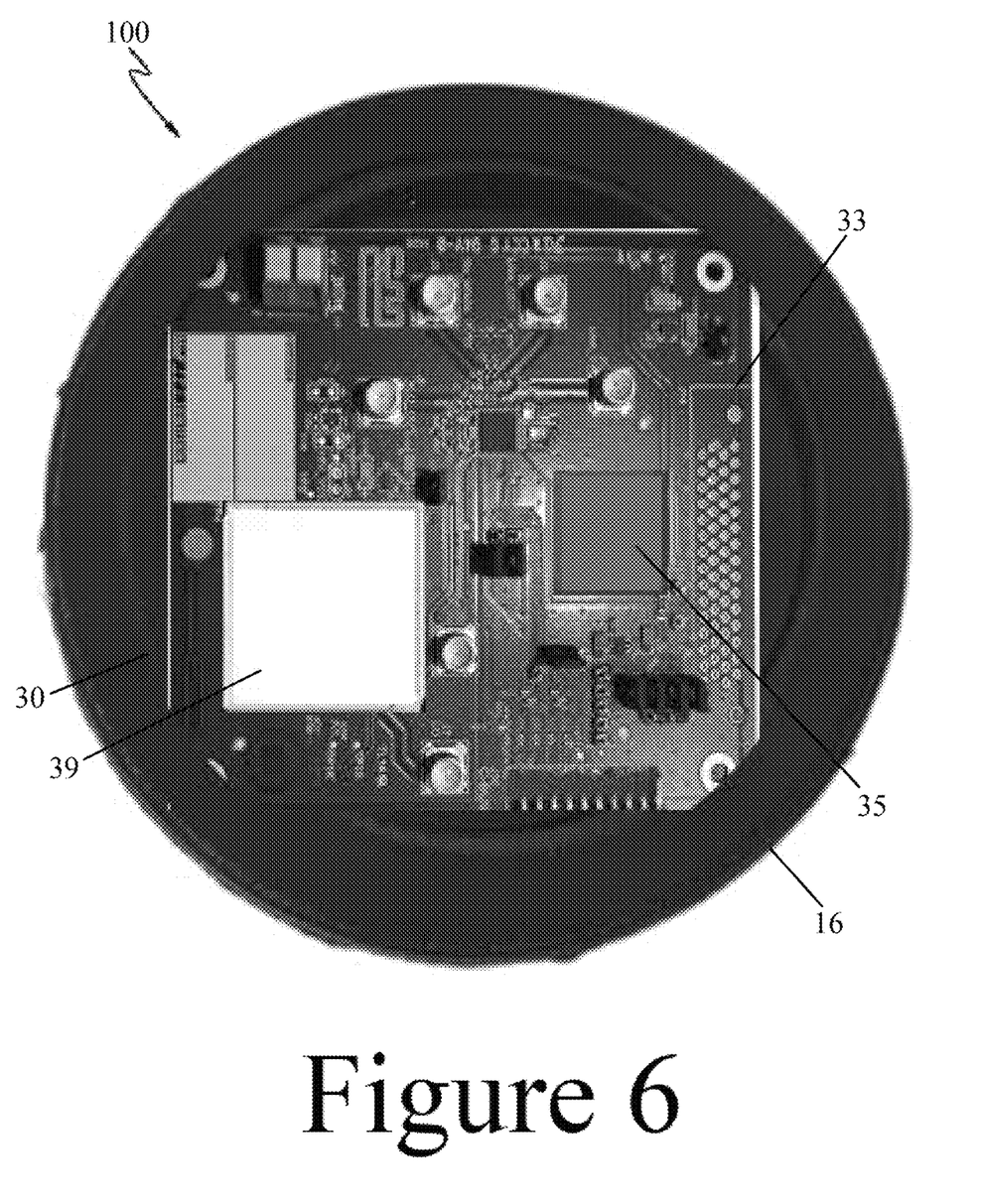
FIG. 6 is a view of an embodiment of an axle monitoring system of the present invention.

FIG. 6 depicts an embodiment of an axle monitoring system of the present invention, wherein a circuit board-based sensor assembly 33 is shown inserted into plug 16 internal void 28. As shown by the embodiment of FIG. 6, circuit board-based sensor assembly 33 may be sized to fit within internal void 28. In one embodiment, at least a portion of an edge 34 of sensor assembly 33, such as, but not limited to, one or more corners 36 of sensor assembly 33 (not visible in FIG. 6) are constrained by portions of inner lip 30. In other embodiments (not shown), a circuit board-based sensor assembly 33 may comprise other shapes and/or dimensions. In other embodiments (not shown), constraint of circuit board-based sensor assembly 33 may be accomplished by other means, as would be understood by one skilled in the art.

In other embodiments (not shown), a sensor assembly 33 may be provided in a protective case that is disposed within plug 16 internal void 28. In one embodiment, such a case may comprise dimensions only nominally greater than those of a circuit board-based sensor assembly 33. In other embodiments, one or more circuit board-based sensor assemblies 33 may comprise smaller dimensions, as the dimensions of the case effectuate the restraint thereof within internal void 28 by inner lip 30. In one embodiment, such a case may comprise a substantially liquid impermeable component designed to prevent liquids (such as, but not limited to, axle lubricating oil) from contacting the one or more circuit board-based sensor assemblies 33 housed there within. In one embodiment, such a case may comprise aluminum or copper, but the invention is not so limited, and a case may comprise other metal and/or non-metal materials. In one embodiment (not shown), a case may contain a humidity or other moisture-related sensor at least partially penetrating an outer surface thereof. In one aspect, such a moisture-related sensor may be utilized to identify higher than desired levels of water in the axle oil (not shown).

Figure 7:
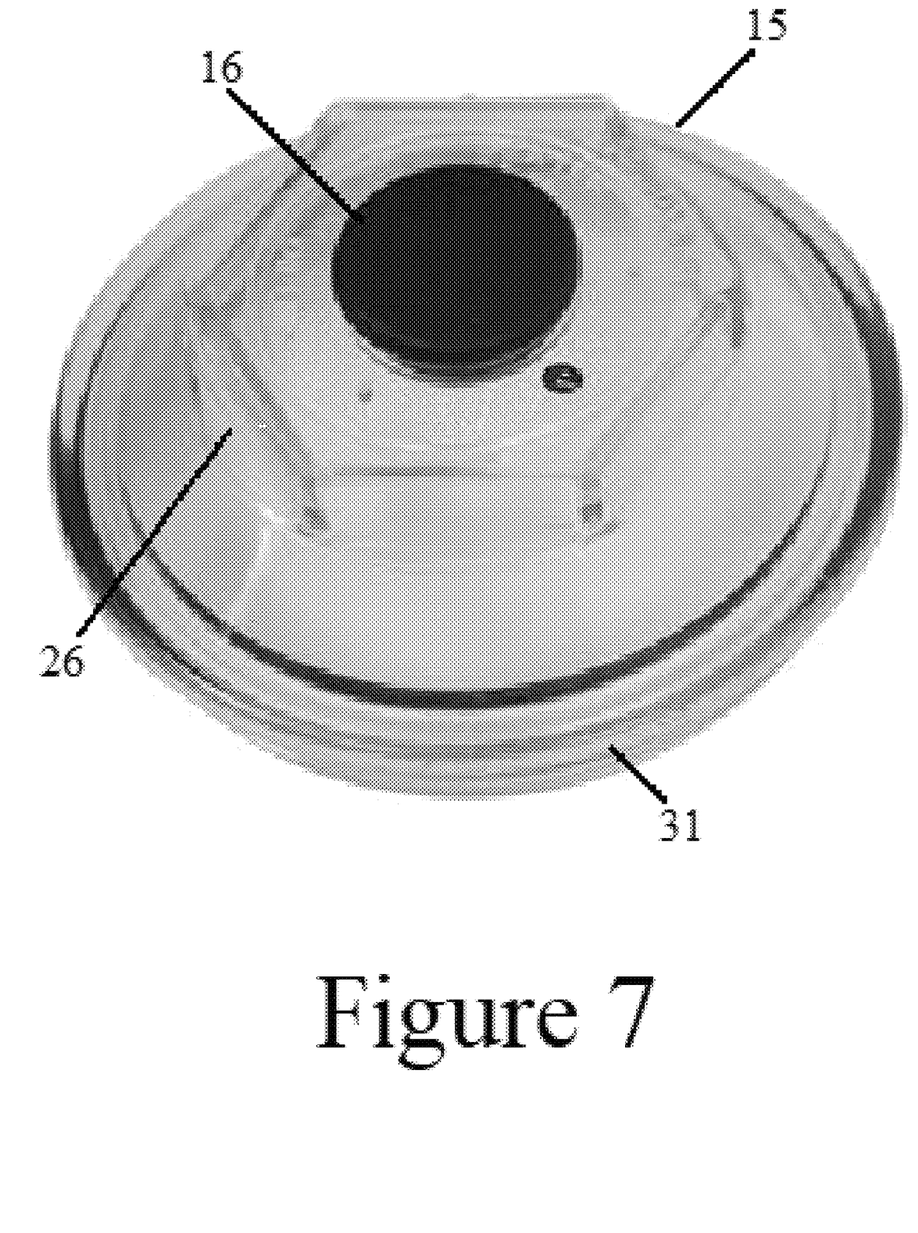
FIG. 7 is a top perspective view of an axle hub assembly oil bath equipped with an embodiment of an axle monitoring system of the present invention.

FIG. 7 depicts a perspective "top" view of an oil bath cap 15 equipped with an embodiment of a plug 16 of the present invention. In the embodiment of FIG. 7, oil bath cap 15 comprises a torque component 26 (in this example a hexagonal protuberance) that can be utilized to apply a rotational torqueing force to oil bath cap 15 to tighten and/or loosen screwed connection between oil bath cap 15 and a hub drum 9 outer opening 27. In other embodiments (not shown), oil bath cap 15 may comprise other means for allowing for the application of rotational torque thereto, as would be understood by one skilled in the art.

Figure 8:
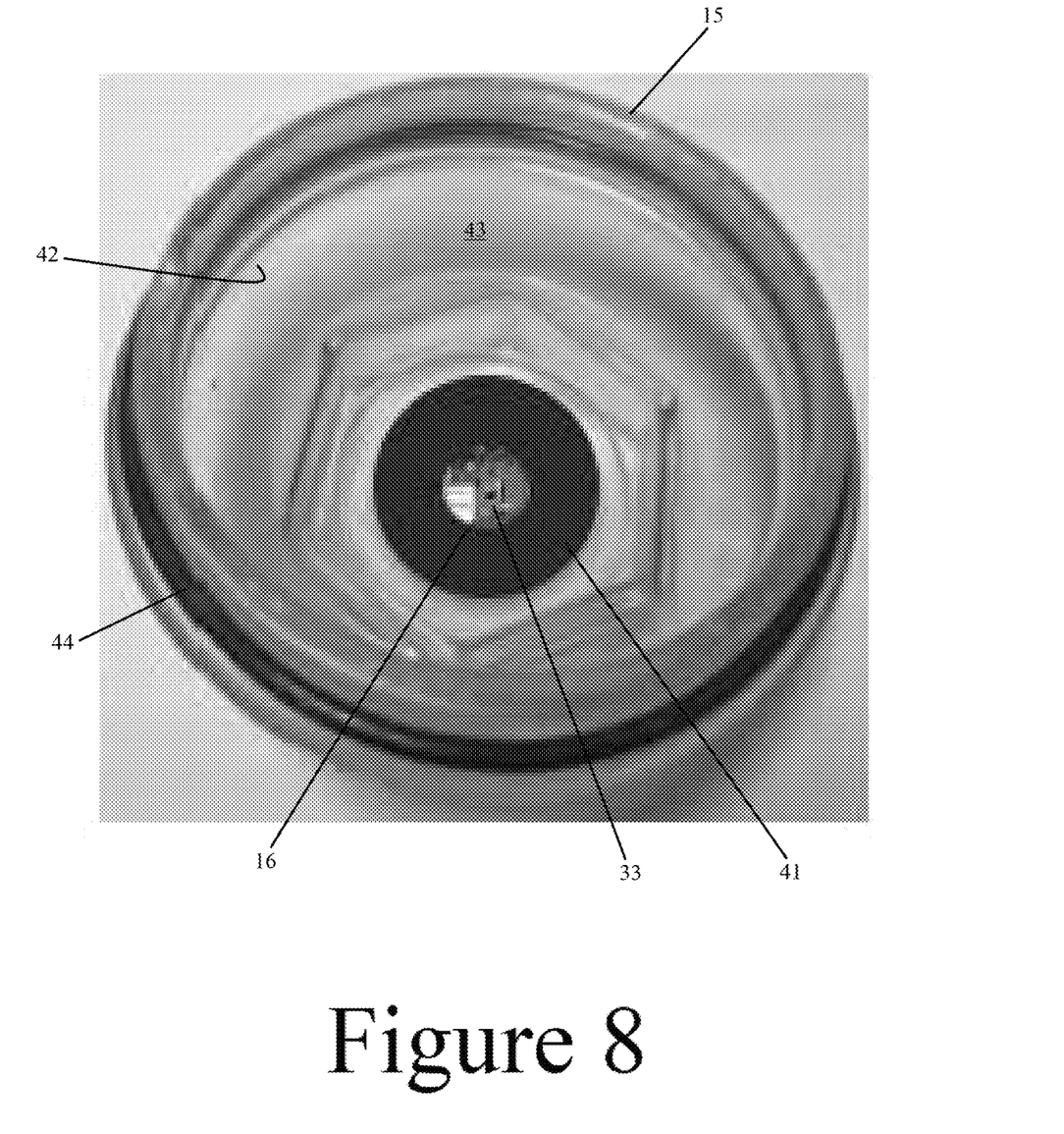
FIG. 8 is a bottom perspective view of an axle hub assembly oil bath equipped with an embodiment of an axle monitoring system of the present invention.

Referring now to FIG. 8, a "bottom" view of the plug 16 equipped oil bath cap 15 embodiment of FIG. 7 is depicted. In the embodiment of FIG. 8, a portion of sensor assembly 33, which is disposed within plug 16, is visible. As described above, in the embodiment of FIG. 8, the outer portion 41 of inner lip 30 contacts inner surface 42 of oil bath cap 15 (proximate orifice 21) to help secure plug 16 within orifice 21. In the embodiment shown in FIG. 8, a portion of the "bottom" side of sensor assembly 33 circuit board 38 is exposed to an internal cavity 43 of oil bath cap 15. In one embodiment (not shown), a cover comprising a flexible, substantially flat and round protection component may be placed about lower edge 24 of plug 16 (thereby covering the opening thereof) prior to insertion of the plug 16 into the oil bath cap 15. In one aspect, such a protective cover may be installed onto the plug 16 prior to the oil bath cap 15 being attached to the axle hub assembly 1.

Figure 9:
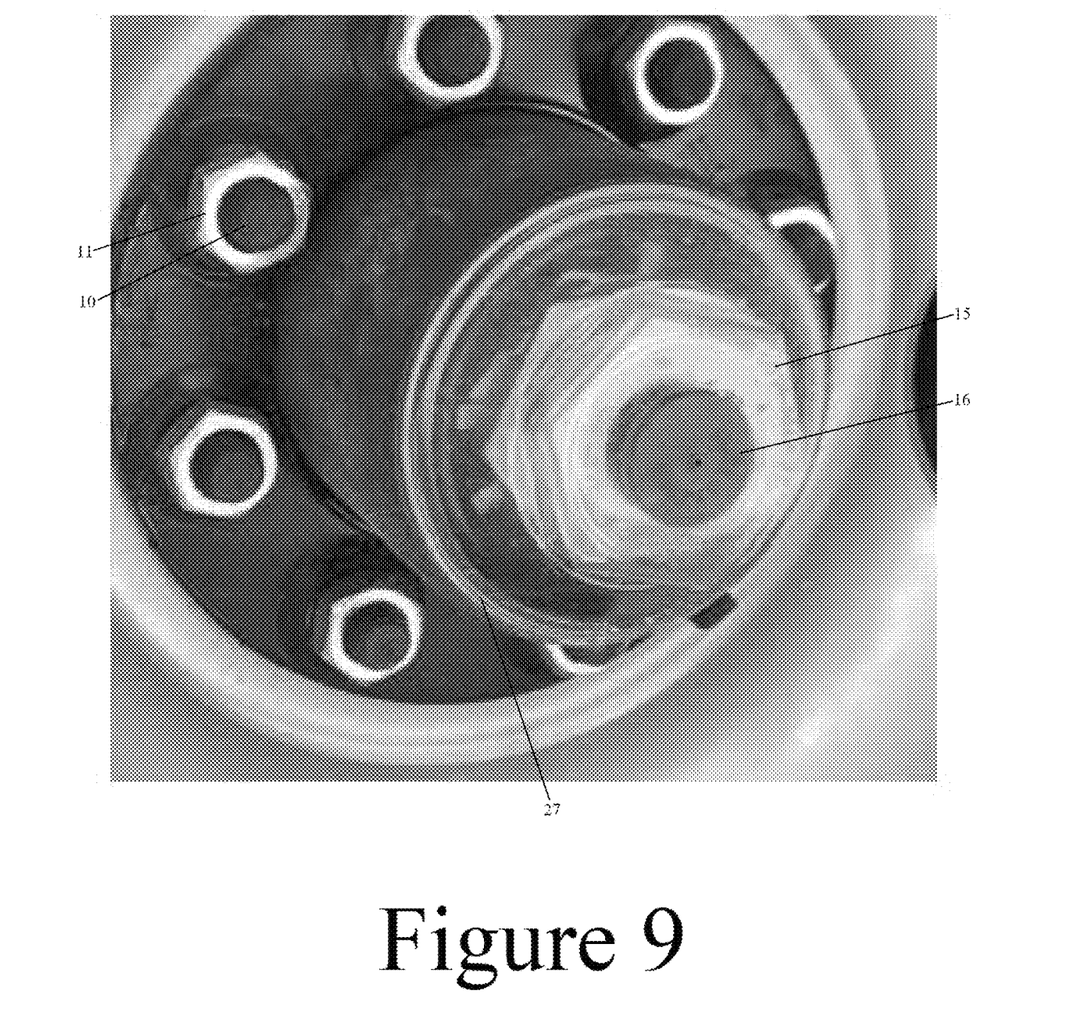
FIG. 9 is a view of an end portion of an axle equipped with an embodiment of an axle monitoring system the present invention.

FIG. 9 depicts a view of an end portion of an axle 4 wherein an installed oil bath cap 15 is equipped with an embodiment of a plug 16 of the present invention. In one aspect, within plug 16 may be disposed an embodiment of a sensor assembly 33 of the present invention. In one aspect, a sensor assembly 33 may be accessible via removal of the plug 16, as one skilled in the art would understand.

Referring now to FIG. 10, a schematic representation of a trailer comprising a pair of axles is depicted. Such a depiction is merely exemplary, and embodiments of the present invention may be employed with an unpaired axle or with three or more proximately positioned axles. In one embodiment, a trailer 37 comprises a pair of axles 5 in parallel alignment. In this embodiment, each end 4 of each axle 5 is equipped with a wheel/tire 19, each of which is operationally connected to a hub drum 9 (not shown), which is part of an axle hub assembly 1 (not shown), and reversibly fastened thereto with one or more lug nuts (not shown), each of which are in screwed engagement with a lug 10 (not shown). In one aspect, at least one axle 5 contains there within a volume of liquid axle lubricant (oil) (not shown). In one embodiment, one or more of the axle hub assemblies 1 are equipped with an axle monitoring system 100 (not shown) at least partially inserted into an oil bath cap 15 (not shown) as described above.

Operation

Generally, a trailer is equipped with at least one axle monitoring system 100 as previously described. In one embodiment, a prior art plug 16 is removed from the oil bath cap 15 orifice 21, as would be understood by one skilled in the art, whereupon an axle monitoring system 100 would be installed on the axle 5 by inserting a plug 16 comprising a sensor assembly 33 into an oil bath cap 15. As the trailer is utilized in normal operation, i.e., being pulled by a motor vehicle, the axle monitoring system 100 is operated to measure/monitor various physical parameters of the trailer and the axle(s) to which an axle monitoring system 100 has been installed. In one embodiment, at least one axle monitoring system 100 is operated to monitor the physical location of the trailer 37 and/or the temperature and/or level of axle 5 lubricants of the axle onto which the axle monitoring system 100 is installed. In one embodiment, an external device (not shown) can send an electronic signal ("ping") to the GPS tracking chip 39 to track its location. In other embodiments, the axle monitoring system 100 may measure vibrational energy of the axle 5 and/or moisture content (humidity) of the axle 5 oil. In operational embodiments wherein an axle monitoring system 100 is installed at each end 4 of an axle 5, the axle monitoring systems 100 may further be employed to measure the distance between the axle monitoring systems 100 (e.g., for axle 5 structural integrity). In operational embodiments wherein an axle monitoring system 100 is installed on each of paired axles 5, the axle monitoring systems 100 may further be employed to measure the distance between the axle monitoring systems 100, and hence the axles 5, (e.g., for axle 5 alignment integrity). In one embodiment, each axle monitoring system 100 has a unique identifier that allows other installed axle monitoring systems 100 and/or an external monitoring system (not shown) to specifically identify it.

In one embodiment, one or more components of an axle monitoring system 100 may collect, compile and/or store sensed data locally and/or transmit such data, in raw or processed form, to one or more remote devices, such as, but not limited to, a computing device (i.e., a device comprising at least one microprocessor) (not shown). In various embodiments, a radio-frequency repeater (not shown) may be employed to better enable signal transmission (e.g., for communication with a remote computing device) for longer trailers, such as trailers greater than thirty-two feet in length, as would be understood by one skilled in the art. In one embodiment, data relating to GPS tracking chip 39 is communicated via cellular communication, i.e., radio frequency transmission. In one embodiment, data relating to temperature/humidity sensor 35 is communicated via I$^2$C (Inter-Integrated Circuit) technology. In various embodiments, a remote device may be located within the vehicle pulling the trailer and/or a central fixed location. In one aspect, data collected and/or compiled by the axle monitoring system 100 may be used to alert or otherwise provide notice that pre-determined parameter levels or set points/ranges are no longer being maintained.

Method

An exemplary method of utilizing an embodiment of a system 100 of the present invention comprises:

An Axle Monitoring System Assembly Step, comprising inserting a sensor assembly, such as a circuit board-mounted sensor assembly 33, and positioning the sensor assembly within an internal void of an oil bath cap plug, such as an internal void 28 of an oil bath cap plug 16, to provide an axle monitoring system, such as axle monitoring system 100;

An Axle Monitoring System Installation Step, comprising engaging the axle monitoring system with an oil bath cap, such as oil bath cap 15, such as by inserting the cap plug into an oil bath cap orifice, such as orifice 21, wherein the oil bath cap is a component of an axle hub assembly, such as axle hub assembly 1, with which a trailer, such as trailer 37, is equipped; and An Axle Monitoring Step, comprising operating the axle monitoring system to measure and/or monitor physical parameters associated with the axle hub assembly and/or trailer.

The foregoing method is merely exemplary, and additional embodiments of a method of utilizing an axle monitoring system of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

I claim:

1. An axle monitoring system comprising:
   an oil bath cap plug; and
   a sensor assembly;
   wherein:
      said sensor assembly comprises a microcircuit board;
      said microcircuit board is equipped with:
         a power provision component;
         a GPS tracking chip; and
         an oil level monitor;
      said sensor assembly is insertable into and retainable within said oil bath cap plug; and
      said axle monitoring system is at least partially insertable into and retainable within an oil bath cap of a trailer axle assembly.

2. The axle monitoring system of claim 1, comprising at least one component selected from the group consisting of:
   a temperature sensor,
   a humidity sensor,
   a proximity sensor that senses the proximity of said trailer axle assembly to another trailer axle assembly, and
   a vibrational energy detector that senses vibrational energy within said trailer axle assembly.

3. The axle monitoring system of claim 1, wherein said axle monitoring system collects, compiles and furthermore stores sensed data locally, and/or transmits such data, in raw or processed form, to one or more remote devices.

4. A method of utilizing an axle monitoring system, comprising:
   providing the axle monitoring system of claim 1 at least partially within an oil bath cap of a trailer axle assembly; and
   operating said axle monitoring system such that information and/or data is obtained thereby relating to said trailer axle assembly.

5. The method of utilizing the axle monitoring system of claim 4, wherein at least a portion of said information and/or data is transmitted, in raw or processed form, to one or more remote devices.

6. The method of utilizing an axle monitoring system of claim 4, wherein said information and/or data comprises information and/or data relating to the global position of said trailer axle assembly.

7. The method of utilizing the axle monitoring system of claim 4, wherein said information and/or data comprises information and/or data relating to temperature and/or humidity within said trailer axle assembly.

8. The method of utilizing the axle monitoring system of claim 4, wherein said information and/or data comprises information and/or data relating to oil level within said trailer axle assembly.

9. The method of utilizing the axle monitoring system of claim 4, wherein said information and/or data comprises information and/or data relating to vibrational energy within said trailer axle assembly.

10. The method of utilizing the axle monitoring system of claim 4, wherein said information and/or data comprises information and/or data relating to the proximity of said trailer axle assembly to another trailer axle assembly.

* * * * *